Aug. 11, 1970     J. A. IRVINE     3,524,043
TEMPERATURE-INDICATING AND CONTROL APPARATUS
Filed March 27, 1967     3 Sheets-Sheet 2

Aug. 11, 1970          J. A. IRVINE          3,524,043
TEMPERATURE-INDICATING AND CONTROL APPARATUS
Filed March 27, 1967          3 Sheets-Sheet 3
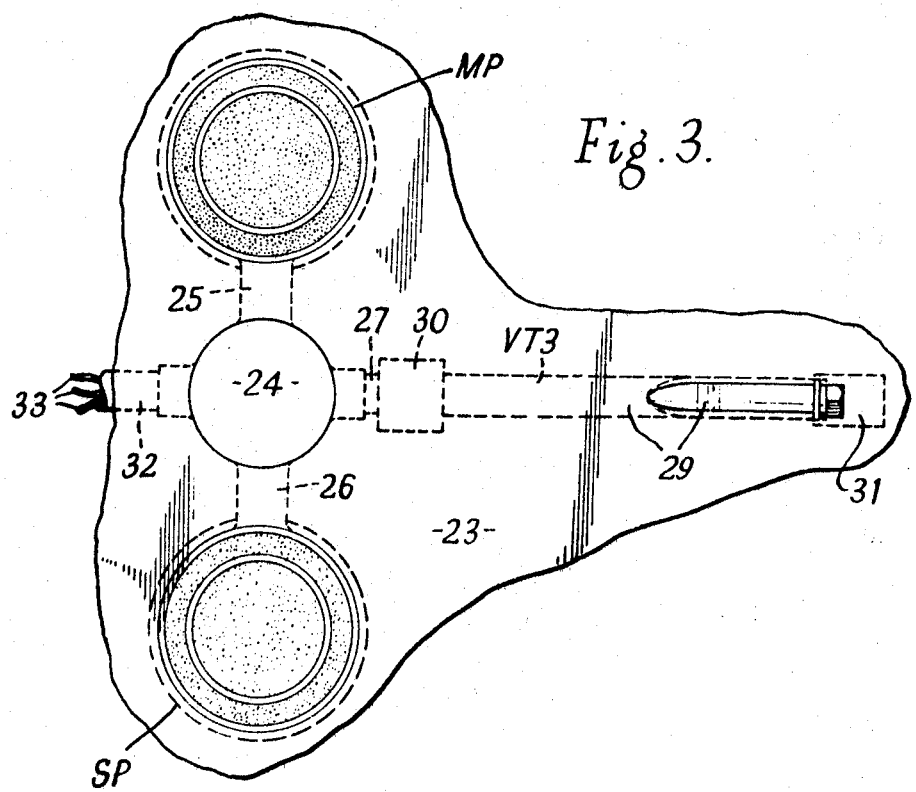
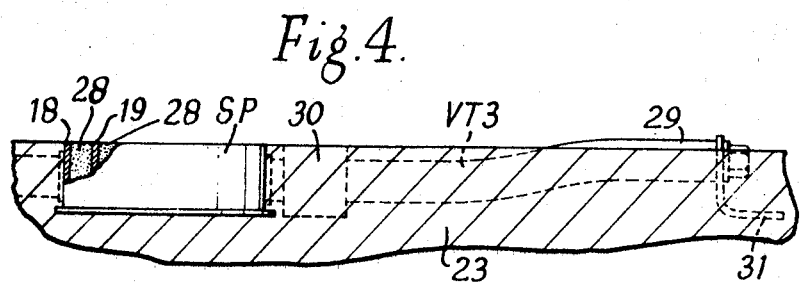

# United States Patent Office 3,524,043
Patented Aug. 11, 1970

3,524,043
TEMPERATURE-INDICATING AND CONTROL APPARATUS
John A. Irvine, Edinburgh, Scotland, assignor to Findlay, Irvine Limited, Edinburgh, Scotland
Filed Mar. 27, 1967, Ser. No. 626,105
Claims priority, application Great Britain, Apr. 7, 1966, 15,789/66
Int. Cl. H05b 1/00
U.S. Cl. 219—200        6 Claims

ABSTRACT OF THE DISCLOSURE

Temperature-indicating and/or controlling apparatus embodies moisture-sensitive apparatus adapted to modify the operation of a temperature-sensitive transistor. The moisture-sensitive device or a secondary moisture-sensitive device embodies a heater to melt ice or snow that may form or fall thereon.

The present invention relates to apparatus for use in indicating or controlling, or both indicating and controlling, the temperature of at least a part of a body or device and is concerned particularly, but not exclusively, with such apparatus for use in a range of temperatures at and near the freezing point of water.

There are many different circumstances in which it is desirable to know that a body or device or at least a part of it is approaching a temperature at or near the freezing point of water.

For example if the surface of a road or airfield runway approaches freezing point it is desirable for this to be known so that gritting teams can be warned.

Where roads or runways have heating elements embedded in them to prevent ice formation a warning has to be given, or automatic action has to be taken, to switch on the heating elements whenever the temperature of the road or runway-surface falls to say 36° F.

Furthermore where ice formation would constitute a hazard or is undesirable it is davantageous to take action to heat the body or device concerned or at least to heat that part of it which is significant in relation to ice-formation when it is wet whereas it could be left unheated if it were dry. Examples are railway points, transmission aerials for television, radar and other purposes.

According to the present invention, temperature-sensitive apparatus for indicating or controlling or both indicating and controlling the temperature of at least a part of a body or device comprises a temperature-sensitive element in the form of a transistor mounted on or in a body or device and connected to an amplifier for use in indicating or controlling, or both indicating and controlling the temperature of at least a part of the body or device as a function of the current in the collector-emitter circuit of the transistor, moisture-sensitive means being provided which are responsive to moisture and are coupled to the temperature-sensitive transistor in such a manner that, in operation, the base current in the transistor is decreased in the presence of moisture in or on the moisture-sensing means. Thus both the temperature-sensing transistor and the moisture-sensing means can be mounted in, say, the surface of a road. The adjustment of the apparatus can be made such that in normal conditions with no moisture the output of the amplifier is caused to operate a device such as a relay whenever the temperature at the road surface falls to, say, 32° F. The moisture-sensing device or its associated circuit can then be so adjusted that the relay is operated at 37° whereby an apparent indication of freezing conditions is given in wet conditions in good time before freezing actually occurs. Where the invention is embodied in control apparatus for automatically controlling heating elements in a road it can be arranged that, in dry conditions, the heating elements are switched on when the temperature falls to a few degrees below freezing whereas, in wet conditions, the heating elements are switched on when the temperature falls to a few degrees above freezing point. The aim in heating a dry road at a few degrees below freezing point is to ensure that rain falling on the road surface will not immediately freeze and cause danger. Like arrangements or adjustments can be made for the other examples previously given such as television transmitting aerials and railway points.

To enable the condition of dry snow or ice to be detected and indicated or used to operate temperature-controlling apparatus the moisture-sensing means, or auxiliary moisture-sensing means, can be provided with a heating element specifically for melting snow or ice that may reach it and by converting it to water enable the moisture-sensing element or auxiliary moisture-sensing element to operate and hence adjust the base current in the temperature-sensing transistor.

The invention will now be described by way of example, with reference to the accompanying drawings in which:

FIG. 3 shows an arrangement of probes in a road and

FIG. 4 shows an elevation, partly in section, of FIG. 3.

Figure 1:
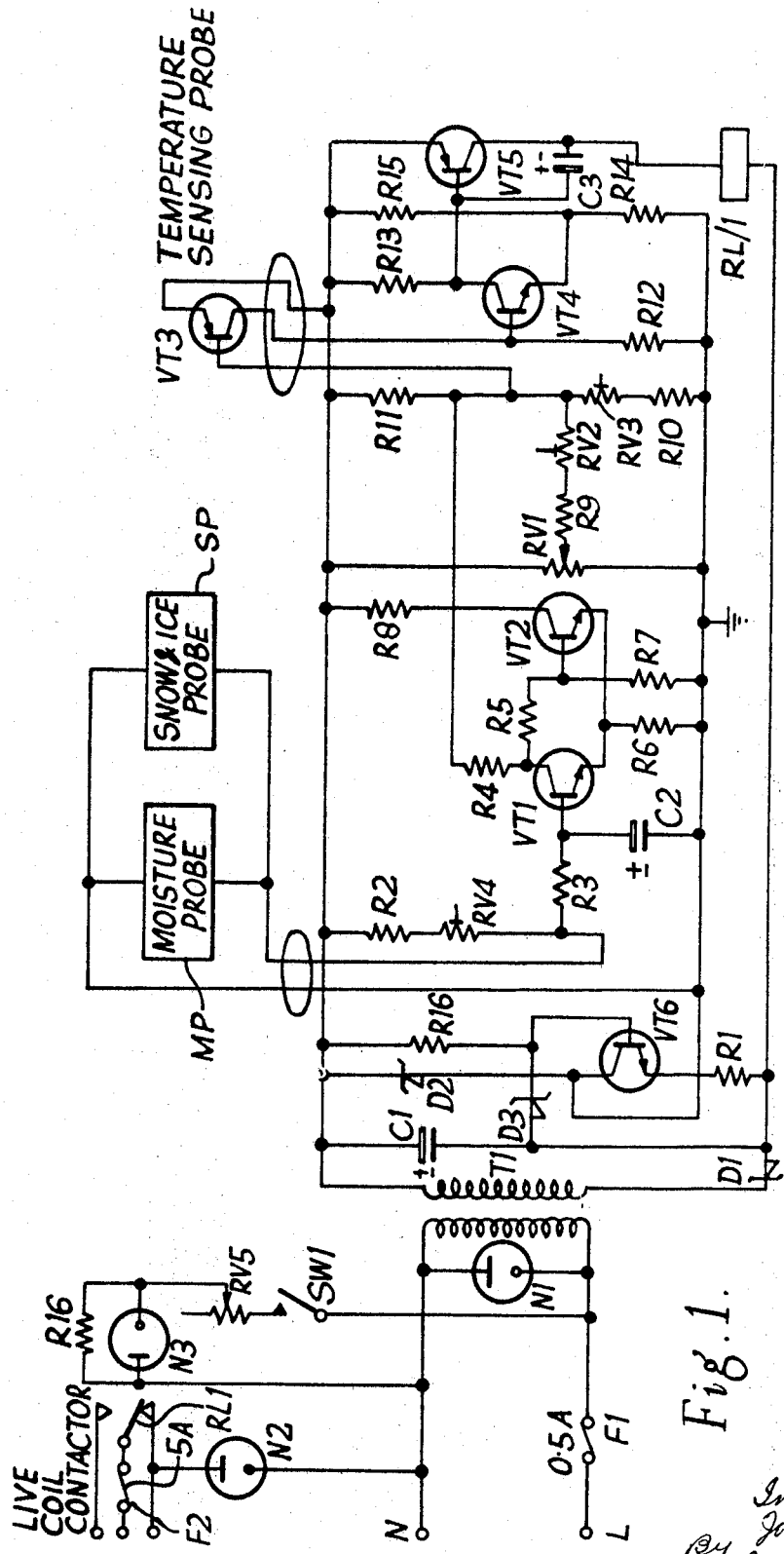
FIG. 1 is a circuit diagram of one embodiment of the invention.

In the drawing a temperature-sensing transistor VT3 has its collector connected to a load resistor R12 and to the input of an amplifier embodying two transistors VT4 and VT5.

The current flowing through the load resistor R12, and hence the input voltage to the amplifier VT4–VT5, is dependent upon the temperature of the transistor and the adjustment of the current flowing in the base-emitter junction of the transistor VT3. Ignoring the effect of a transistor VT1 and the effects of temperature the current flowing in the base-emitter junction of the transistor VT3 is determined by the voltage across a resistor R11. This resistor forms part of a network of resistors R11, RV3, R10, RV2, R9 and RV1. Of these resistors RV2 and RV3 are variable resistors and RV1 is a variable potentiometer. RV2 and RV3 are adjusted and set during manufacture of the embodiment whereas RV1 can be varied by the user of the apparatus.

The amplifier VT4–VT5 is used to control a relay RL and by adjustment of RV1, RV2 and RV3 it can be arranged that the relay RL operates at a given temperature such as 30° F. The relay RL can be used to energise a warning device such as a lamp or it can switch-on heating elements or both. In the drawing a neon lamp N2 is shown to be associated with contacts RL1 of the relay RL and is illuminated when the relay RL is operated.

Associated with the network of resistors R11, RV3, R10, RV2, R9 and RV1 is a bi-stable circuit including two transistors VT1 and VT2. The collector current of the transistor VT1 passes through the resistor R11 and hence the base-emitter current of the temperature-sensing transistor VT3 can, at a given temperature, have either of two values dependent upon which of its two stable states the bi-stable circuit VT1–VT2 is in.

The setting of the bi-stable circuit VT1–VT2 is governed by the input voltage to the transistor VT1 which is determined by a potential divider embodying two resistors R2 and RV4 a moisture probe MP and a snow-and-ice probe SP. The moisture probe MP can take any form suitable to provide a marked reduction of resistance when wet.

It may for example consist of an earthed ring insulated from a rod or a further ring co-axial with the earthed ring. When water bridges the insulation between the rod and earthed ring the resistance therebetween is markedly reduced. With the rod connected to the junction of R3 and RV4 the input voltage to the base of the transistor VT1 is relatively high when the probe MP is dry whereas it is relatively low when the probe MP is wet.

Thus it can be arranged that with the probe MP dry the bistable circuit VT1–VT2 has the transistor PT1 conducting and VT2 non-conducting. The collector current of VT1 passing through R11 adds to the voltage drop across R11 and hence causes an increase in the current in the temperature-sensing transistor. This transistor must therefore be cooled to a lower temperature to operate the relay.

With the moisture probe MP wet the transistors VT1 and VT2 are arranged to become respectively non-conducting and conducting whereby the current through R11 receives no contribution from VT1 and the temperature at which the relay RL operates is restored to its previous value.

Thus it can readily be arranged by adjustment of RV4 that the relay RL is operated at a few degrees above freezing point when the moisture-probe MP is wet and at a few degrees below freezing point when the moisture probe MP is dry.

To deal with the circumstances of dry snow or dry ice the moisture probe, or preferably a second probe SP connected in parallel with the moisture-probe MP, is provided with a heater to melt the snow or ice and hence provide moisture for bridging the probe and actuating the bi-stable circuit VT1–VT2 in the same manner as already described for moisture on the moisture-probe MP.

The heater for melting the ice or snow on the probe SP is shown at R16 which is supplied from a mains supply N,L through a switch SW1 and a variable resistor RV5. A neon lamp N3 connected across the heater R16 is used to indicate that the switch SW1 is closed.

A further neon lamp N1 is for indicating that the mains supply is switched-on.

The D.C. supply for the circuit is provided by means of a transformer T1 with an associated rectifier D1 and smoothing capacitor C1. Stabilization of the D.C. supply is effected by a known form of stabilizing circuit embodying Zener diodes D2 and D3, a transistor VT6 and resistors R1 and R16.

Figure 2:
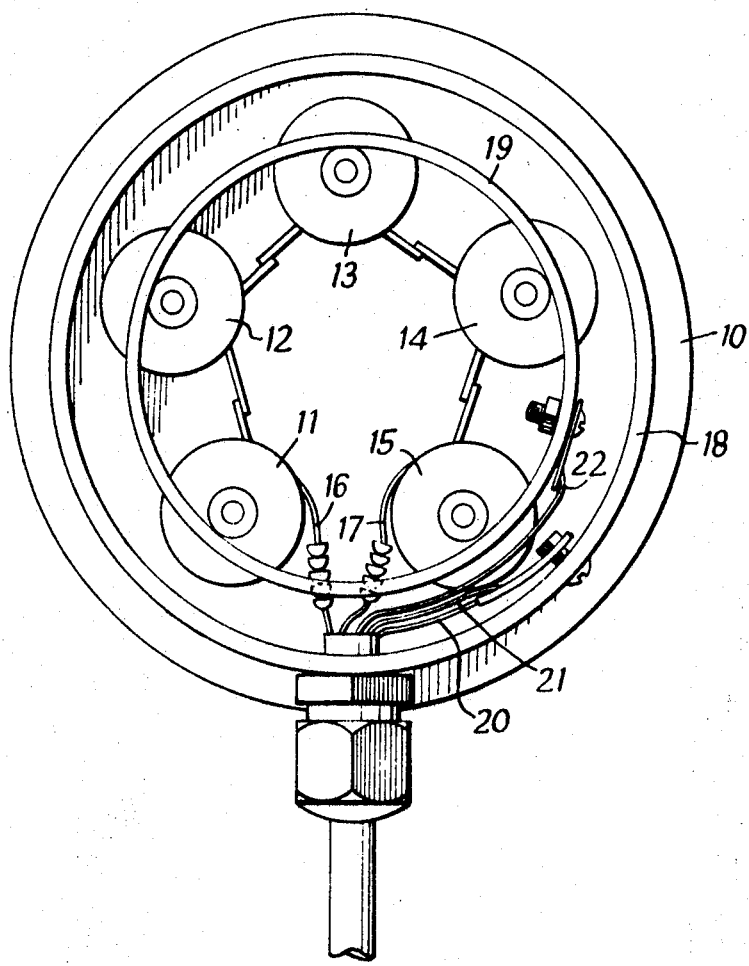
FIG. 2 shows one form of probe in a partly manufactured state.

Referring now to FIG. 2 this shows in plan a suitable form of heated probe in a partly manufactured state. It comprises a base 10 of insulating material to which are affixed five heating elements 11, 12, 13, 14 and 15 connected in series between two heater-supply leads 16 and 17. Also mounted on the base is a short brass cylinder 18 and a further short brass cylinder 19. These are connected to leads 20, 21 and 22 as shown. The upper edges of the two cylinders 18 and 19 are arranged to lie in a common plane and to complete manufacture the spaces between the two rings and within the space bounded by the ring 19 is filled with a potting resin such as Araldite up to the upper edges of the cylinders 18 and 19.

Thus moisture falling on the filler surface and bridging the two cylinders brings about a reduction in the resistance between the two cylinders. If snow should fall or ice should form on the surface of the filler it would be melted by the heaters 11 and 15 and the water so produced would likewise bridge the cylinders to reduce the resistance between them.

To provide a probe for moisture only, the arrangement of FIG. 2 is used without the heaters and filled with a potting resin such as Araldite.

Referring now to FIGS. 3 and 4, these show an assembly of three probes MP, SP and VT3 embedded in the surface of a road 23. The assembly comprises a junction box 24 to which the probes MP, SP and VT3 are connected by conduits 25, 26, 27. The snow-and-ice probe SP is as described with reference to FIG. 2 and has its upper surface flush with the road surface as seen in FIG. 4 which also shows the filling 28 of Araldite.

Similarly the moisture probe MP is arranged with its upper surface flush with the road surface but, of course, this probe does not have heaters.

The transistor of the third probe VT3 is disposed in a tube 29 of stainless steel coupled to the conduit 27 by a coupling 30 of heat-insulating material. A bracket 31 is provided at the outermost extremity of the tube 29 to anchor this extremity of the tube 29 in the road.

It will be seen that the outermost half of the tube 29 rises slightly above the road surface to be exposed to the atmosphere and it is in this half that the transistor VT3 of FIG. 1 is located. A lead-out conduit 32 is provided for the cables from the probes.

What I claim is:

1. Temperature-sensitive apparatus comprising, in combination:
    (a) a temperature-sensitive transistor to provide an emitter-collector current dependent upon temperature;
    (b) a moisture-sensing element to provide an impedance decreasing with increase of moisture thereon;
    (c) and means coupling said element to the base of said transistor to reduce the base current of said transistor with increase in the amount of moisture on said element, whereby said emitter-collector current dependent upon temperature is decreased with increase of moisture present upon said element.

2. Temperature-sensitive apparatus as claimed in claim 1, wherein said coupling means comprises:
    (a) a switch;
    (b) means coupling said moisture-sensing element to said switch to operate said switch when moisture on said element exceeds a predetermined amount; and
    (c) means coupling said switch to said base to reduce said base current upon operation of said switch.

3. Temperature-sensitive apparatus as claimed in claim 2, wherein said switch comprises a bi-stable circuit.

4. Temperature-sensitive apparatus comprising, in combination:
    (a) a temperature-sensitive transistor to provide an emitter-collector current dependent upon temperature;
    (b) a moisture-sensing element to provide an impedance decreasing with increase of moisture thereon;
    (c) a snow and ice-sensing element comprising a heater to melt snow and ice and providing an impedance decreasing with increase of melted snow and ice thereon;
    (d) and means coupling said elements to the base of said transistor to change the base current of said transistor with variation in the amount of moisture on said moisture-sensitive element and with variation in the amount of snow and ice upon said snow and ice-sensing element.

5. Temperature-sensitive apparatus as claimed in claim 1, including a relay coupled to said transistor for operation thereby whenever said emitter-collector current falls to a predetermined value, whereby said relay operates at a higher temperature when said moisture-sensing element is wet than when said moisture-sensing element is dry.

6. Temperature-sensitive apparatus as claimed in claim 1, including a relay coupled to said transistor for operation thereby whenever said emitter-collector current falls to a predetermined value, whereby said relay operates at a lower temperature when said moisture-sensing element is dry and no snow and ice are on said snow and ice-sensing element than when said moisture-sensing element is wet and when snow and ice are on said snow and ice-sensing element.

References Cited

UNITED STATES PATENTS

| | | | |
|---|---|---|---|
| 2,717,957 | 9/1955 | Ohlheiser | 250—27 |
| 3,157,800 | 11/1964 | Burwell | 307—116 |
| 3,164,820 | 1/1965 | Hulett | 340—234 |
| 3,229,271 | 1/1966 | Frant | 340—235 X |
| 3,308,271 | 3/1967 | Hilbiber | 307—310 X |
| 3,311,172 | 3/1967 | Hammerschmidt et al. 340—235 X |

JOSEPH V. TRUHE, Primary Examiner

C. L. ALBRITTON, Assistant Examiner

U.S. Cl. X.R.

219—501; 200—61.04